(12) United States Patent
Hashimoto et al.

(10) Patent No.: US 7,039,236 B2
(45) Date of Patent: May 2, 2006

(54) IMAGE PROCESSOR AND PATTERN RECOGNITION APPARATUS USING THE IMAGE PROCESSOR

(75) Inventors: Yoshihito Hashimoto, Osaka (JP); Kazutaka Ikeda, Gose (JP)

(73) Assignee: Matsushita Electric Works, Ltd., Kadoma (JP)

( * ) Notice: Subject to any disclaimer, the term of this patent is extended or adjusted under 35 U.S.C. 154(b) by 720 days.

(21) Appl. No.: 10/204,429

(22) PCT Filed: Dec. 10, 2001

(86) PCT No.: PCT/JP01/10817

§ 371 (c)(1),
(2), (4) Date: Aug. 30, 2002

(87) PCT Pub. No.: WO02/48964

PCT Pub. Date: Jun. 20, 2002

(65) Prior Publication Data

US 2003/0012442 A1    Jan. 16, 2003

(30) Foreign Application Priority Data

Dec. 14, 2000  (JP) .............................. 2000-380972
Apr. 23, 2001  (JP) .............................. 2001-124554

(51) Int. Cl.
*G06K 9/68*  (2006.01)

(52) U.S. Cl. ..................................... 382/218; 382/261

(58) Field of Classification Search ................ 382/218, 382/264, 261
See application file for complete search history.

(56) References Cited

U.S. PATENT DOCUMENTS 6,128,410 A     10/2000  Park et al.
6,665,448 B1 *  12/2003  Maurer ....................... 382/261

FOREIGN PATENT DOCUMENTS

JP       11-213127       8/1999

OTHER PUBLICATIONS

Bernd Jaehne, "Digitale Bildverarbeitung—3. Auflage", 1993, Springer Verlag, p. 15, 92, 112, 115.*

(Continued)

*Primary Examiner*—Brian Werner
*Assistant Examiner*—Jonathan Schaffer
(74) *Attorney, Agent, or Firm*—Oblon, Spivak, McClelland, Maier & Neustadt, P.C.

(57) ABSTRACT

An image processor for generating, from a surface image of an object having a pattern, a processed image having a distinct contrast between the pattern and a background, is provided. This image processor comprises a first smoothing filter for generating a first smoothed image; a second smoothing filter for generating a second smoothed image; a weighting unit for multiplying each of pixel values of the first smoothed image by a weight coefficient of 1 or more to determine a weighted pixel value; a differential image generator for subtracting each of weighted pixel values provided by the weighting unit from a pixel value of a corresponding pixel of the second smoothed image to generate a differential image; and an image extracting unit for extracting pixel values having the positive sign from the differential image to obtain the processed image. For example, this image processor can be utilized in a pattern recognition apparatus.

11 Claims, 8 Drawing Sheets

OTHER PUBLICATIONS

Bernd Jaehne: "Digitale bildverarbeitung -3. auflage" Springer Verlag, pp. 15, 92, 112, and 115 1993.

E.R. Davies: "Machine vision: theory, algorithms, practicalities, 2nd edition" Academic Press, pp. 3-9 1997.

A. Vanzo et al.: "An image enhancement technique using polynomial filters" Proceedings of the International Conference on Image Processing (ICIP), vol. 3, Conf. 1, pp. 477-481 Nov. 13, 1994.

* cited by examiner

IMAGE PROCESSOR AND PATTERN RECOGNITION APPARATUS USING THE IMAGE PROCESSOR

TECHNICAL FIELD

The present invention relates to an image processor for providing, from a surface image of an object having a pattern such as letters or symbols, a processed image having a distinct contrast between the pattern and a background, and a pattern recognition apparatus with the image processor, which is preferably used to accurately detect an alignment mark on an optically transparent or translucent substrate in a manufacturing process of liquid-crystal display devices.

BACKGROUND ART

In the past, an image processing technique has been utilized to recognize an alignment mark such as letters or symbols given on an object to be inspected. In this method, a surface image (a gray-scale image) of the object is converted to a binary image according to an appropriate threshold value. Since the alignment mark has a different concentration from a background, pixels corresponding to the alignment mark can be extracted from the pixels of the background.

However, this process of generating the binary image has a problem that when a concentration (brightness) of the alignment mark is not constant in the surface image, a part of the alignment mark can be not extracted, or a part of the background is erroneously extracted together with the alignment mark. As a result, since the generated binary image includes incorrect image data, the alignment mark can not be recognized from the binary image with a high degree of accuracy.

Such a problem will become a reality in the case of recognizing an alignment mark given on an optically transparent or translucent substrate in a manufacturing process of liquid-crystal display devices. For example, as shown in FIGS. 12A and 12B or FIGS. 13A and 13B, when a surface image 30 of the substrate having an alignment mark AM ("+" mark) is taken through a translucent film placed on the substrate by an image pickup unit, it is very difficult to recognize the alignment mark from the surface image with reliability because of a poor contrast between the alignment mark and the background, and the influence of undesired air bubbles AB trapped between the translucent film and the substrate.

To improve the recognition accuracy, it is also proposed to repeatedly perform a recognition treatment to an extracted edge of the alignment mark. However, there is a case that the recognition accuracy can not be sufficiently improved even when the recognition treatment is repeatedly performed. In such a case, the alignment mark must be detected by a visual inspection. This brings a reduction in production efficiency and an increase in production cost.

In addition, when an air bubble(s) AM is trapped at the vicinity of the alignment mark between the translucent film and the substrate, there is a case that light irradiated to the substrate to take the surface image by the image pickup unit is reflected at a surface of the translucent film inflated by the air bubble, so that a part of the alignment mark is lost from the surface image. In this case, the alignment mark can not be recognized by carrying out normalized correlation with use of, as a reference image, a characteristic portion of the alignment mark extracted by a binary-image processing technique, or a general view of the alignment mark obtained by a gray-scale image processing technique. Even when the alignment mark is recognized, the reliability of recognition results will be low.

SUMMARY OF THE INVENTION

Therefore, a primary concern of the present invention is to provide an image processor having the capability of providing, from a surface image of an object having a pattern, a processed image having a distinct contrast between the pattern and a background.

That is, the image processor comprising:

a first smoothing filter for generating a first smoothed image by determining, with respect to each of pixels of the surface image, a mean concentration value for the pixel and neighbor pixels in a first region defined around the pixel;

a second smoothing filter for generating a second smoothed image by determining, with respect to each of pixels of the surface image, a mean concentration value for the pixel and neighbor pixels in a second region that is defined around the pixel so as to be greater than the first region;

a weighting unit for multiplying each of pixel values of the first smoothed image by a weight coefficient of 1 or more to determine a weighted pixel value;

a differential image generator for subtracting each of weighted pixel values provided by the weighting unit from a pixel value of a corresponding pixel of the second smoothed image to generate a differential image; and an image extracting unit for extracting pixel values having the positive sign from the differential image to obtain the processed image.

In the present invention, since the processed image is generated by use of the first smoothed image generated by the first smoothing filter and the second smoothed image generated by the second smoothing filter, it is possible to accurately extract only the pattern from the surface image even when the background around the pattern includes a pixel having substantially the same concentration as the pattern. In addition, even when a concentration of the pattern is not constant in the surface image, it is possible to emphasize the contrast between the pattern and the background. By the way, the "pattern" used in this specification includes various kinds of shapes such as circuit patterns, letters, marks, or geometric symbols, on an object to be inspected.

It is preferred that the image processor described above further comprises a reverse image generator for generating a reverse image of the surface image. The reverse image generator determines a concentration value of each of pixels of the reverse image by subtracting a concentration value of each of pixels of the surface image of the object from a maximum concentration value of the surface image. As a result, the first and second smoothing filters respectively generate the first and second smoothed images from the reverse image. When it is required to generate the processed image from the surface image that includes a pattern having a higher brightness than the background, it is possible to provide the processed image having the distinct contrast, as in the above case of generating the processed image from the surface image that includes a pattern having a lower brightness than the background.

A further concern of the present invention is to provide a pattern recognition apparatus using the image processor described above, which has the capability of recognizing a pattern on an object to be inspected with a high degree of reliability, even when a difference in concentration (brightness) between the pattern and the background is small. That is, this apparatus comprising:

an image pickup unit for providing a surface image of an object;

the first image processor composed of the above image processor to generate, from a first surface image of a reference object having a pattern, a first reference image having a distinct contrast between the pattern and a background;

a memory for storing the first reference image; and a detector for comparing a surface image of an inspection object having the same pattern as the reference object with the first reference image to recognize the pattern on the inspection object.

It is preferred that the pattern recognition apparatus described above further comprises:

a means for providing a second surface image including the pattern of the reference object, the second surface image having a wider view field than the first reference image;

a second image processor for generating, from the second surface image of the reference object, a second reference image having a distinct contrast between the pattern and a background, the second image processor composed of the above image processor; and wherein the detector compares a surface image of the inspection object given by the image pickup unit with the second reference image to search an image region including the pattern in the surface image of the inspection object, and recognizes the pattern from the image region by use of the first reference image.

In addition, it is preferred that the pattern recognition apparatus described above comprises an image splitter for providing split images each including at least a part of the pattern from the first reference image, and wherein the detector compares the surface image of the inspection object with the first reference image and each of said split images, and recognizes the pattern on the inspection object according to a comparison result with a highest degree of agreement therebetween.

Another concern of the present invention is to provide an image processing method of providing, from a surface image of an object having a pattern, a processed image having a distinct contrast between the pattern and a background. That is, this image processing method comprises the steps of:

generating a first smoothed image by determining, with respect to each of pixels of the surface image, a mean concentration value for the pixel and neighbor pixels in a first region defined around the pixel;

generating a second smoothed image by determining, with respect to each of pixels of the surface image, a mean concentration value for the pixel and neighbor pixels in a second region that is defined around the pixel so as to be greater than the first region;

multiplying each of pixel values of the first smoothed image by a weight coefficient of 1 or more to determine a weighted pixel value;

subtracting each of weighted pixel values obtained in the multiplying step from a pixel value of a corresponding pixel of the second smoothed image to determine a differential image; and extracting pixel values having the positive sign from the differential image to obtain the processed image.

These and still other objects and advantages will become apparent from the best mode for carrying out the invention described below and the attached drawings.

BEST MODE FOR CARRYING OUT THE INVENTION

The followings are preferred embodiments of the present invention. However, these embodiments do not limit the scope of the present invention.

Figure 1:
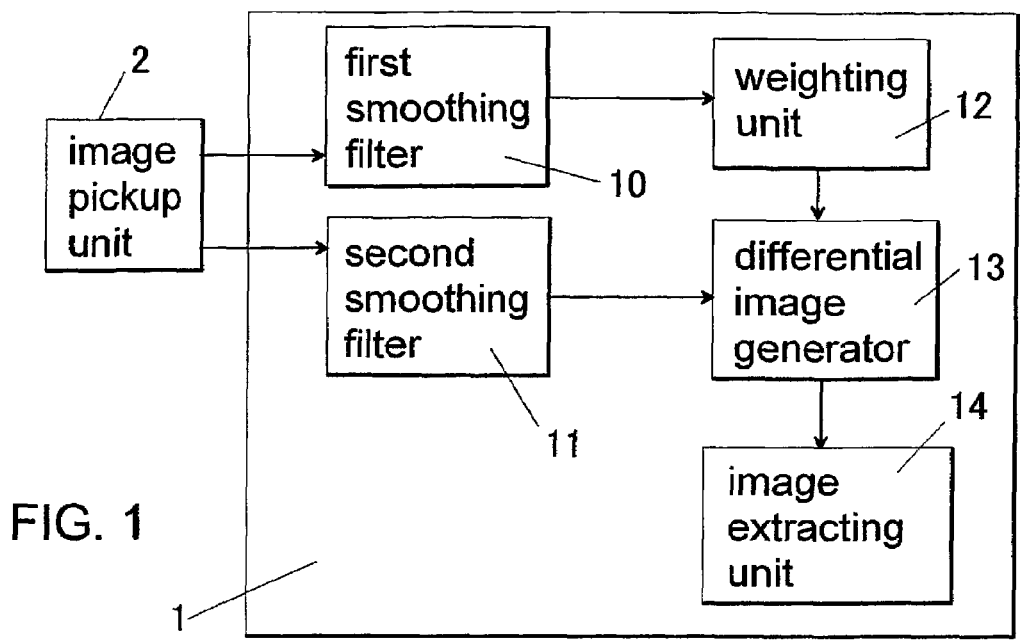
FIG. 1 is a block diagram of an image processor according to a first embodiment of the present invention.
Figure 2A:
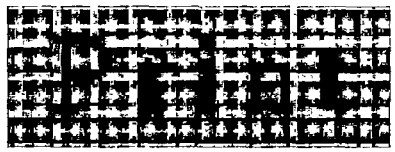
FIG. 2A is a surface image of an object.
Figure 2B:
FIGS. 2B to 2E are processed images obtained in the respective steps of an image processing method of the present invention.
Figure 2C:
Figure 2D:
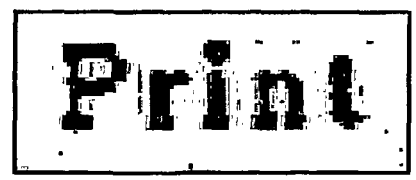
Figure 2E:
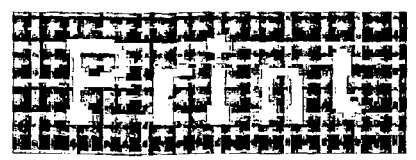
Figure 3:
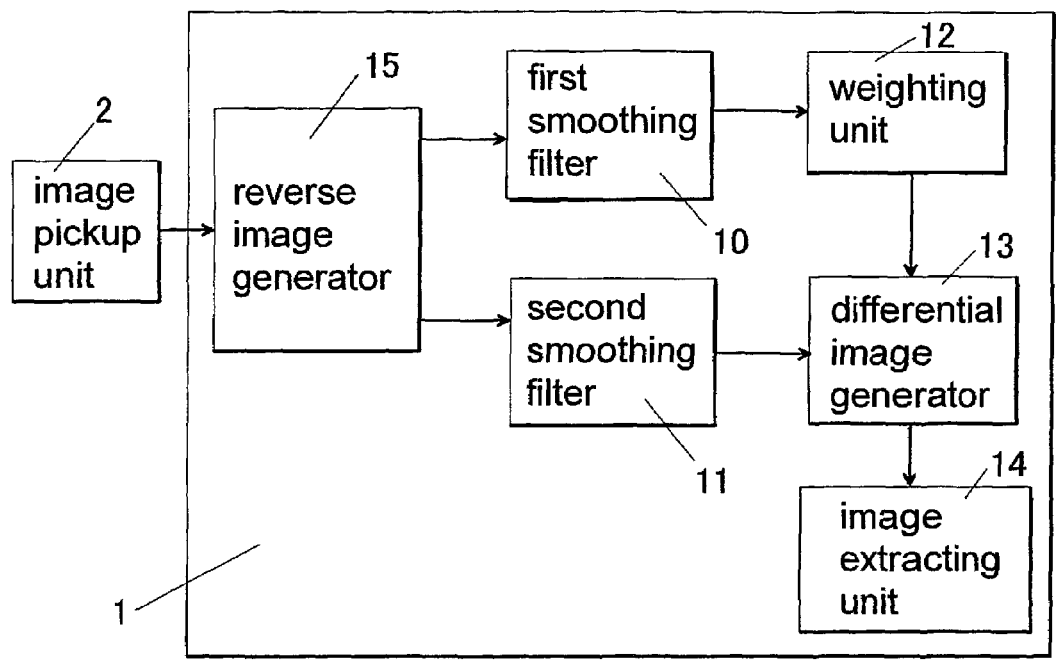
FIG. 3 is a block diagram of an image processor with a reverse image generator according to a modification of the first embodiment.

An image processor 1 of the first embodiment of the present invention is explained referring to FIG. 1 to FIG. 3. An object used in this embodiment has an alignment mark having a lower brightness than a background. A surface image including the alignment mark of the object can be obtained by a conventional image pickup unit 2 such as TV cameras.

As shown in FIG. 1, the surface image taken by the image pickup unit 2 is sent to each of first and second smoothing filters (10, 11) of the image processor 1. The first smoothing filter 10 determines, with respect to each of pixels of the surface image, a mean concentration value for the pixel and neighbor pixels in a first region defined around the pixel to generate a first smoothed image. As the first region, a square region "$(2n_1+1)\times(2n_1+1)$" can be used, wherein "$n_1$" is an integer.

On the other hand, the second smoothing filter 11 determines, with respect to each of pixels of the surface image, a mean concentration value for the pixel and neighbor pixels in a second region that is defined around the pixel so as to be greater than the first region to generate a second smoothed image. As the second region is a square region "$(2n_2+1)\times(2n_2+1)$", wherein "$n_2$" is an integer larger than "$n_1$". Therefore, for example, when the first region is the square pixel region "3×3" ($n_1=1$), the square region "5×5" ($n_2=2$) can be used as the second region. Thus, since the number of pixels used to determine the mean concentration value by the second smoothing filter 11 is greater than the number of pixels used to determine the mean concentration value by the first smoothing filter 10, the second smoothed image has a higher smoothing level than the first smoothed image.

The first smoothed image is sent to a weighting unit 12 of the image processor of the present invention. In the weighting unit, each of pixel values of the first smoothed image is multiplied by a weight coefficient α of 1 or more to obtain a weighted pixel value. It is preferred that the weight coefficient is within a range of $1.0 \leq \alpha \leq 1.5$.

The weighted pixel values and the second smoothed image are then sent to a differential image generator 13 of the image processor 1. In the differential image generator, each of the weighted pixel values is subtracted from a pixel value of a corresponding pixel of the second smoothed image to generate a differential image. That is, each of pixel values (Xi) of the differential image is expressed by the following equation:

$$Xi = Ti - \alpha \times Si$$

wherein "Si" is a pixel value of the first smoothed image, "α" is the weight coefficient, and "Ti" is a pixel value of the corresponding pixel of the second smoothed image.

The differential image obtained by the differential image generator 5 is sent to an image extracting unit, in which pixel values having the positive sign are extracted from the differential image to obtain a processed image having a distinct contrast between the alignment mark and the background.

For example, according to the image processor 1 explained above, it is possible to generate, from a surface image including a letter arrangement of "Print", as shown in FIG. 2A, a processed image having a distinct contrast between the letter arrangement and the background, as shown in FIG. 2E. That is, the first smoothing filter 10 generates a first smoothed image of the surface image, as shown in FIG. 2B. On the other hand, the second smoothing filter 11 generates a second smoothed image of the surface image, as shown in FIG. 2C. It could be easily understood from these figures that the second smoothed image has a higher smoothing level than the first smoothed image, as described above. After the first smoothed image of FIG. 2B is treated by the weighting unit 13, a differential image is generated from the outputs of the weighting unit and the second smoothed image of FIG. 2C by the differential image generator 13, as shown in FIG. 2D. Then, by extracting pixel values having the positive sign from the differential image of FIG. 2D, the processed image of FIG. 2E is obtained.

By the way, when it is requested to generate a processed image from an object with an alignment mark having a higher brightness than the background, the image processor of the present invention further comprises a reverse image generator 15 for generating a reverse image of the surface image of the object. As shown in FIG. 3, the reverse image generator 15 is arranged between the image pickup unit 2 and the first, second smoothing filters (10, 11). In this reverse image generator 15, a concentration value of each of pixels of the reverse image is determined by subtracting a concentration value of each of pixels of the surface image of the object from a maximum concentration value of the surface image. The reverse image is sent to the first and second smoothing filters (10, 11), respectively, so that the first and second smoothed images are respectively generated from the reverse image according to the similar manner to the above.

Figure 4:
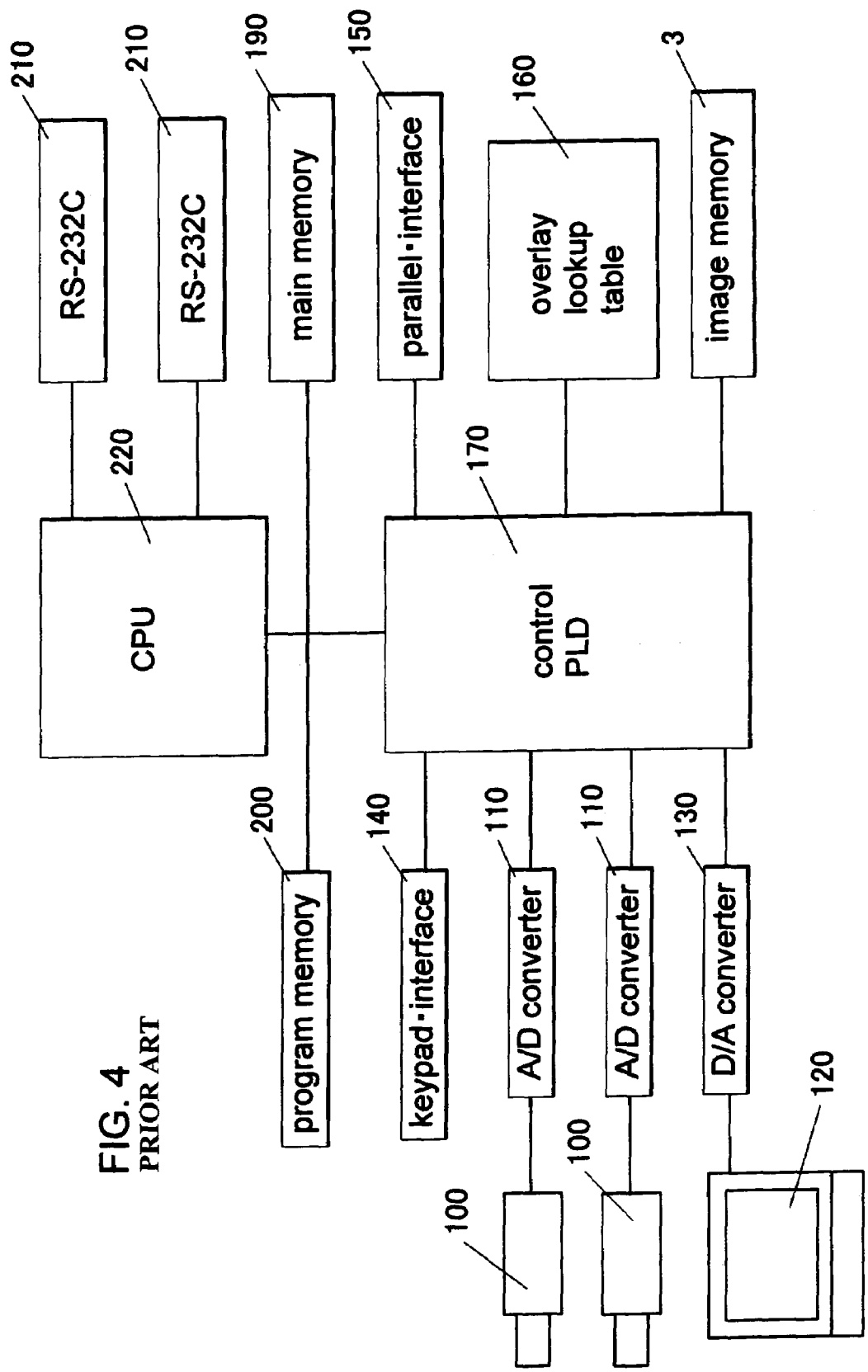
FIG. 4 is a block diagram of a conventional pattern recognition apparatus.

Next, as a second embodiment of the present invention, a pattern recognition apparatus using the image processor of the first embodiment is explained in detail. The pattern recognition apparatus of the present invention can be obtained by equipping a conventional pattern recognition apparatus with the above-described image processor for generating a reference image to be compared with a surface image of an inspection object. For example, as shown in FIG. 4, the conventional pattern recognition apparatus comprises TV cameras 100 as the image pickup unit 2, A/D converters 110, monitor 120, D/A converter 130, keypad-interface 140, parallel-interface 150, overlay-lookup table 160, control PLD 170, image memory 3, main memory 190, program memory 200, RS-232C 210, and a CPU 220 for carrying out programs stored in the program memory 200.

The control PLD 170 is connected to the image memory 3, keypad-interface 140, parallel-interface 150 and the overlay-lookup table 160. In addition, the TV cameras 100 are connected to the control PLD 170 through the A/D converters 110. Besides, the monitor 120 is connected to the control PLD 170 through the D/A converter 130. A connection between the TV cameras 100 and the image memory 3, connection between the image memory 3 and the monitor 120, and a connection between the CPU 220 and the image memory 3 are controlled by the control PLD 170. On the other hand, the CPU 220 is connected to the control PLD 170, program memory 200, main memory 190, and the RS-232C 210.

Figure 5:
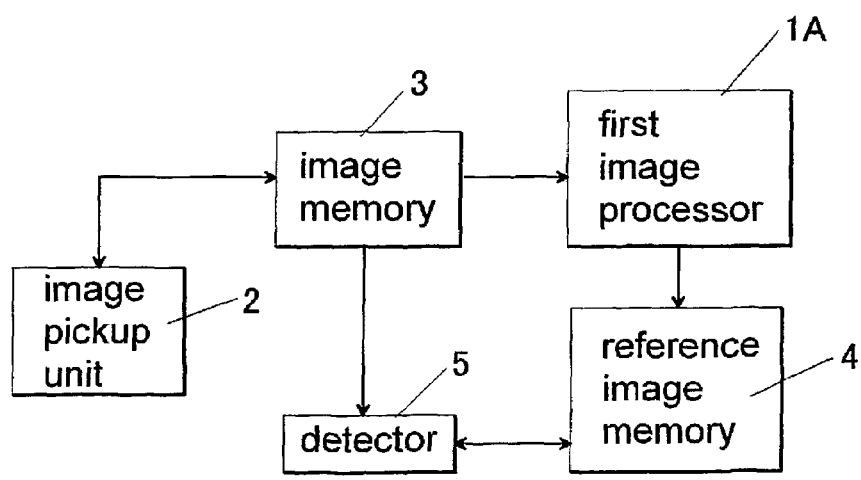
FIG. 5 is a block diagram of a pattern recognition apparatus according to a second embodiment of the present invention.
Figures 6A, 6B:
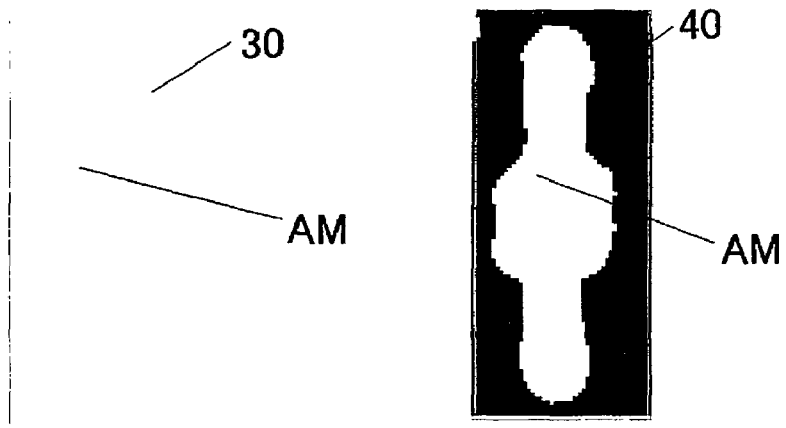
FIG. 6A is a surface image of an alignment mark on an object.
FIG. 6B is a first reference image generated by a first image processor of the present invention.

FIG. 5 is a block diagram illustrating a schematic structure of the pattern recognition apparatus with the image processor of the present invention. This apparatus comprises the image pickup unit 2, image memory 3, first image processor 1A, reference-image memory 4, and a detector 5. For example, the image pickup unit 2 is composed of the TV camera 100 and the A/D converter 110 to take a surface image of an object, as shown in FIG. 6A. The surface image is stored in the image memory 3.

As the first image processor 1A, the image processor 1 of the first embodiment is used. The first image processor 1A generates, from a surface image 30 of a reference object having an alignment mark AM ("+" mark) as a pattern to be recognized, a first reference image 40 having a distinct contrast between the alignment mark AM and a background, as shown in FIG. 6B. The first reference image generated is stored in the reference-image memory 4.

The detector 5 compares a surface image of an inspection object having the same alignment mark as the reference object with the first reference image to recognize the alignment mark on the inspection object. For example, the detector 5 is mainly composed of the main memory 190, program memory 200 and the CPU 220 for carrying out programs stored in the program memory. In the detector 5, the pattern recognition is carried out by a template matching method including normalized correlation operations.

By use of the pattern recognition apparatus of the present embodiment, a pattern recognition operation for an inspection object can be performed, as described below. First, a surface image including an alignment mark of the inspection object is taken by the image pickup unit 2. After the surface image is stored in the image memory 3, the alignment mark in the surface image of the inspection object can be detected by the template matching method including normalized correlation operations with use of the first reference image stored in the reference-image memory 4.

In the past, the alignment mark has been detected by preparing a template including the alignment mark from the surface image of the reference object, and comparing a surface image of an inspection object with the template used as the reference image. In this method, when a difference in contrast between the alignment mark and the background is small, there is a problem that variations in brightness in the surface image of the inspection object cause a reduction in detection accuracy. However, in the present invention, since the processed image having the distinct contrast between the alignment mark and the background is used as the template, it is possible to detect the alignment mark with accuracy even when the difference in contrast therebetween is small.

By the way, when it is required to generate, from a surface image of the reference object with an alignment mark having a higher brightness than the background, a processed image having the distinct contrast, the first image processor 1A further comprises a reverse image generator for generating a reverse image of the surface image of the reference object, as in the case of FIG. 3. This reverse image generator determines a concentration value of each of pixels of the reverse image by subtracting a concentration value of each of pixels of the surface image of the object from a maximum concentration value of the surface image. Therefore, in the first image processor 1A, the first reference image is generated from the reverse image.

Figure 7:
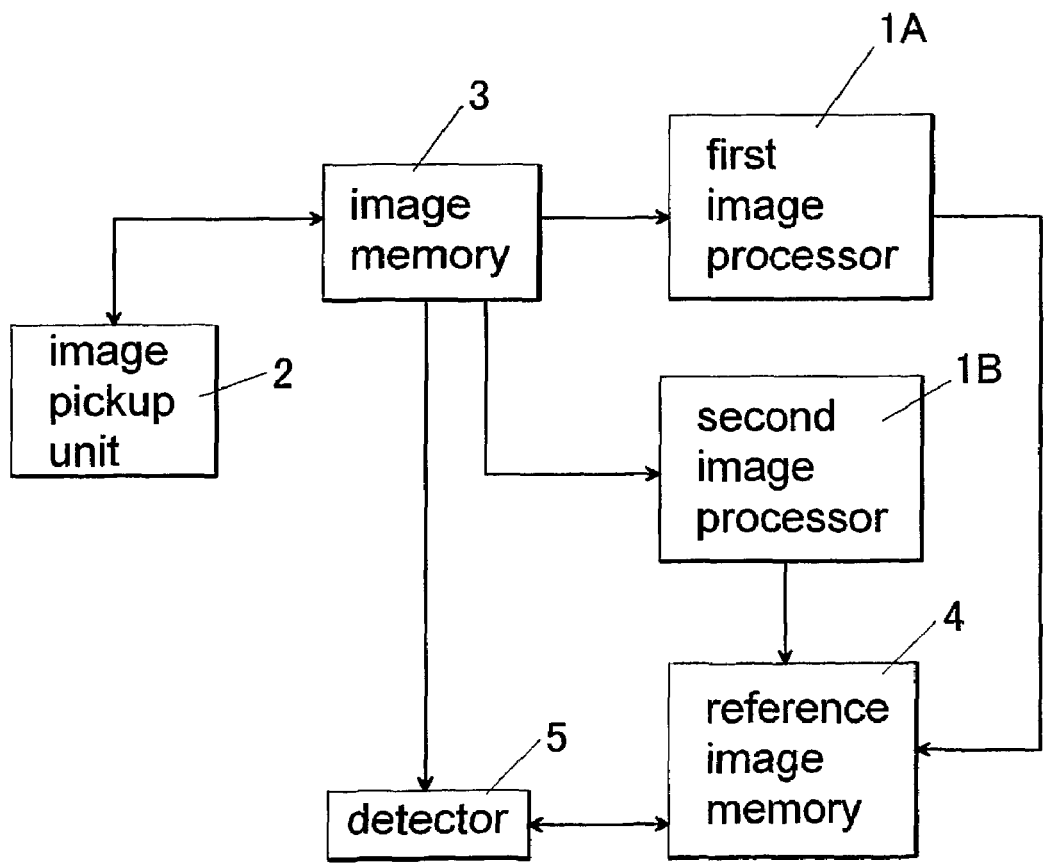
FIG. 7 is a block diagram of a pattern recognition apparatus with a second image processor according to a modification of the second embodiment.
Figure 8A:
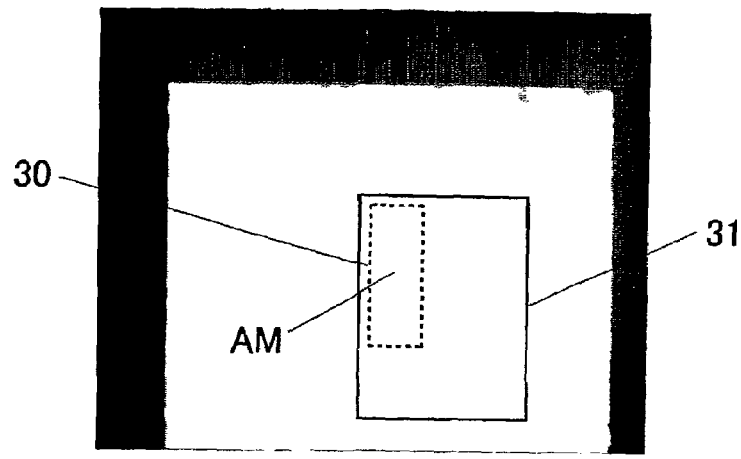
FIG. 8A is a surface image including an alignment mark of an inspection object.

By the way, as shown in FIG. 8A, when a wide-angle surface image of the inspection object is taken by a low magnification so as to include a wider area around the alignment mark, and there is a small difference in contrast between the alignment mark and the background in the wide-angle surface image, there is a fear that the detection accuracy reduces. In such a case, as shown in FIG. 7, it is preferred that the pattern recognition apparatus further comprises an image searching unit comprising a second image processor 1B for generating a second reference image used to search an approximate position of the alignment mark in the wide-angle surface image.

In this case, it is preferred that the image pickup unit 2 is composed of a first image pickup unit for a low-magnification image and a second image pickup unit for a high-magnification image. That is, the first image pickup unit works as a means for providing a surface image of the reference object having a wider view field than the surface image taken by the second image pickup unit. Alternatively, an image pickup unit with a scaling function may be used.

Figure 8B:
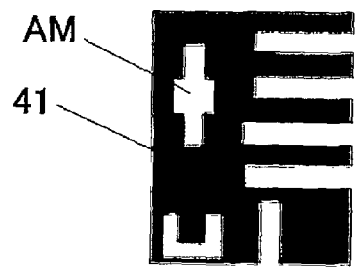
FIG. 8B is a second reference image generated by the second image processor.

As in the case of the first image processor 1A, the image processor 1 of the first embodiment is used as the second image processor 1B. The second image processor 1B generates a second reference image from a surface image 31 of the reference object taken by the first image pickup unit. In the second reference image, a contrast enhancement of the alignment mark and other patterns having the same concentration (brightness) as the alignment mark in the surface image is performed to make a distinct contrast between these patterns and the background, as shown in FIG. 8B. The second reference image can be stored in the reference-image memory 4. Alternatively, another reference-image memory for the second reference image may be added.

Figure 8C:
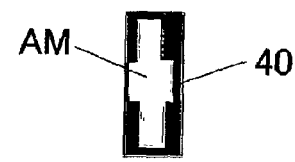
FIG. 8C is the first reference image generated by the first image processor.

In the detector 5, the wide-angle surface image of the inspection object is compared with the second reference image to search at least one image candidate providing the approximate position of the alignment mark. In other words, at least one image region including the alignment mark corresponding to the second reference image is searched from the wide-angle surface image of the inspection object. Next, the searched image region is compared with the first reference image (FIG. 8C) stored in the reference-image memory 4 to detect the alignment mark in the extracted image region by the template matching method including normalized correlation operations. When a plurality of image regions are extracted as the image candidates, each of the image regions is compared with the first reference image, and the alignment mark is detected according to a comparison result with a highest degree of agreement therebetween.

To efficiently perform the recognition operation, the pattern recognition apparatus may comprises an image-data reduction unit (not shown) for performing an image data reduction treatment to the second reference image and the wide-angle surface image of the inspection object to provide a third reference image and a treated surface image of the inspection object, respectively. In this case, the treated surface image of the inspection object is compared with the third reference image by the detector 5 to search the image region including the alignment mark.

The image data reduction treatment comprises the steps of calculating a mean concentration value for pixels in a pixel region (n×n) and replacing the pixel region (n×n pixels) with one pixel of the mean concentration value. For example, when a surface image has the resolution of 640×480 pixels, and the pixel region is composed of 64 (8×8) pixels, a treated surface image having the resolution of 80×60 pixels is obtained by the reduction treatment. By use of the treated surface image and the third reference image, it is possible to remarkably facilitate searching the image region corresponding to the second reference image in the wide-angle surface image of the inspection object.

As in the case of FIG. 3, when the alignment mark has a higher brightness than the background in the surface image of the reference object taken by the first image pickup unit, it is preferred that the second image processor 1B further comprises a second reverse image generator for generating a reverse image of the surface image, as in the case of FIG. 3. The second reverse image generator determines a concentration value of each of pixels of the reverse image by subtracting a concentration value of each of pixels of the surface image from a maximum concentration value of the surface image. In this case, the second reference image is generated from the reverse image by the second image processor 1B.

Figure 9:
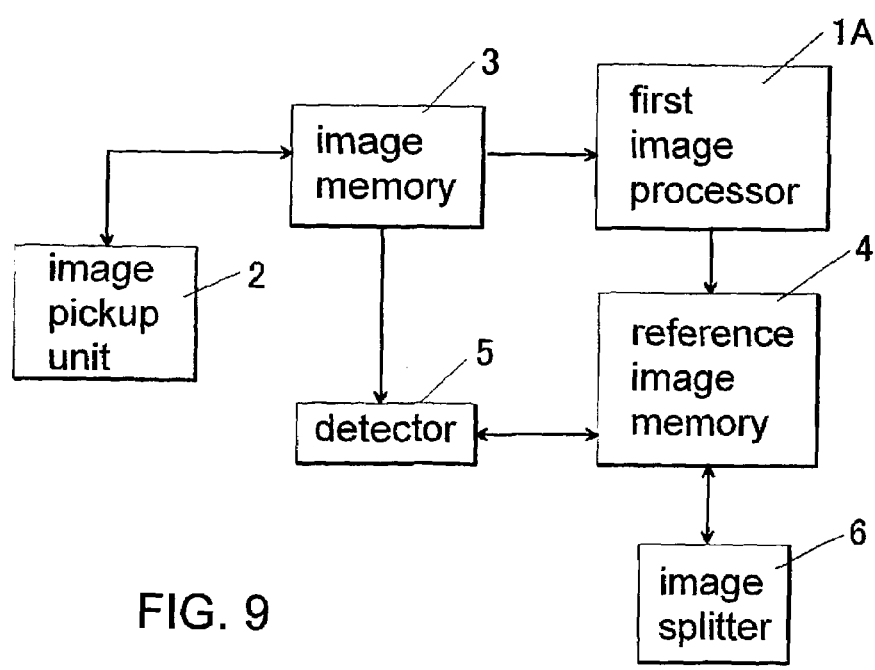
FIG. 9 is a block diagram of a pattern recognition apparatus with an image splitter according to a modification of the second embodiment.

As shown in FIG. 9, when the pattern recognition apparatus comprises an image splitter 6 for providing split images each including at least a part of the alignment mark from the first reference image, it is possible to further improve the accuracy of pattern recognition.

Figure 10A:
FIGS. 10A to 10E are a reference image and split reference images, respectively.
Figure 10B:
Figure 10C:
Figure 10D:
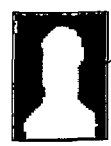
Figure 10E:
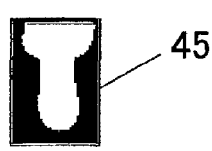

For example, the image splitter 6 can be composed of the main memory 190, and the CPU 220 for carrying out the programs stored in the program memory 200. In FIGS. 10B and 10C, the first reference image 40 of FIG. 10A is split into two parts (42, 43) along a longitudinal axis of the alignment mark AM. In FIGS. 10D and 10E, the first reference image of FIG. 10A is split into top and bottom portions (44, 45) of the alignment mark AM. The first reference image may be split into four or eight parts, if necessary. These split reference images can be also stored in the reference image memory 4. In the detector 5, the surface image of the inspection object is compared with the first reference image and each of the split reference images, and then the alignment mark is recognized according to a comparison result with a highest degree of agreement therebetween.

Figure 10F:
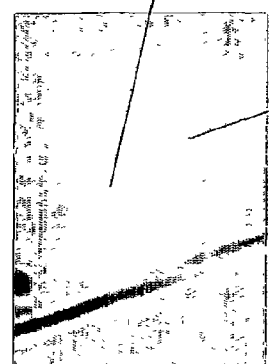
FIG. 10F is a surface image of an alignment mark.

For example, when comparing a surface image 30 of the inspection object of FIG. 10F with the first reference image 40 of FIG. 10A, the degree of agreement therebetween is 0.5. On the other hand, when comparing the surface image 30 of the inspection object of FIG. 10F with the split reference image 44 of FIG. 10D, the degree of agreement therebetween is 0.8. Therefore, in such a surface image of FIG. 10F, it is possible to further improve the recognition accuracy for the alignment mark by use of the split reference image.

When the pattern recognition apparatus has the second image processor 1B for generating the second reference image, it is preferred to further comprise an additional image splitter (not shown) for providing split reference images each including at least a part of the alignment mark from the second reference image. This additional image splitter has substantially the same functions and components as the image splitter 6 for the first reference image generated by the first image processor 1A. In this case, a surface image of the inspection object is compared with the second reference image and each of the split reference images generated by the additional image splitter to search an image region including the alignment mark according to a comparison result with a highest degree of agreement therebetween. Secondary, the searched image region is compared with the first reference image and each of the split reference images generated by the image splitter 6 for the first reference image. According to a comparison result with a highest degree of agreement therebetween, the alignment mark is recognized on the inspection object. Alternatively, the recognition of the alignment mark may be performed by comparing the searched image region with only the first reference image. By use of the image splitter 6 and/or the additional image splitter, even when there is a considerable inhibition factor that a part of the alignment mark is lost, it is possible to recognize the alignment mark with reliability.

Figure 11:
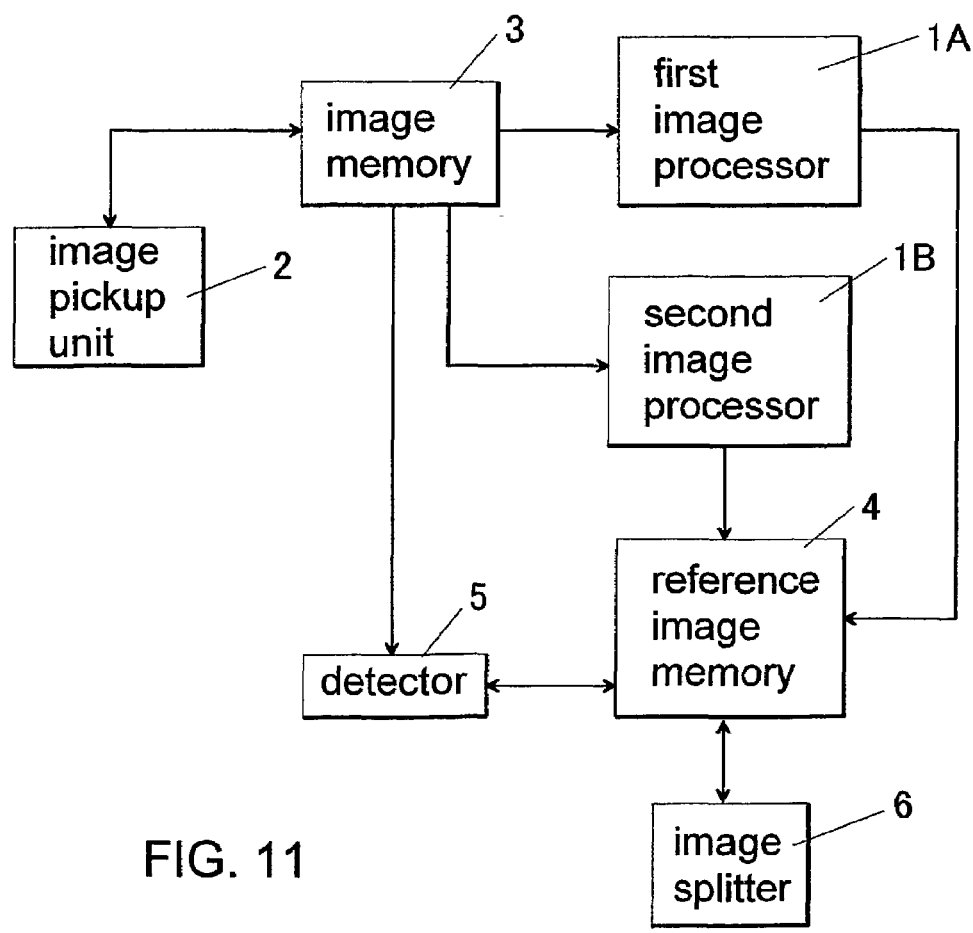
FIG. 11 is a block diagram of a pattern recognition apparatus with the second image processor and the image splitter according to a modification of the second embodiment.
Figure 12A:
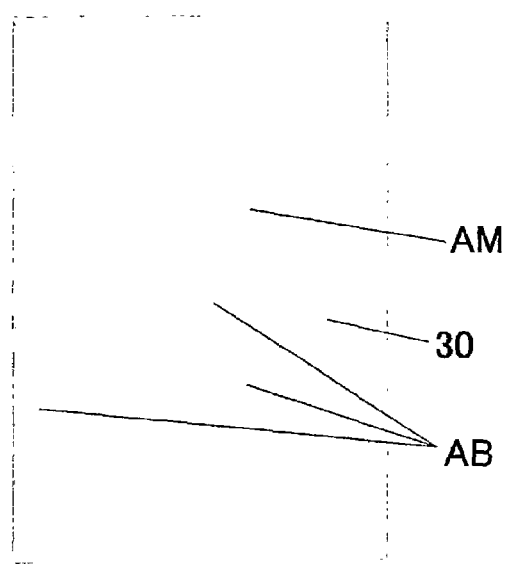
FIGS. 12A and 12B are a surface image including an alignment mark of an inspection object, and an explanatory view of the surface image, respectively.
Figure 12B:
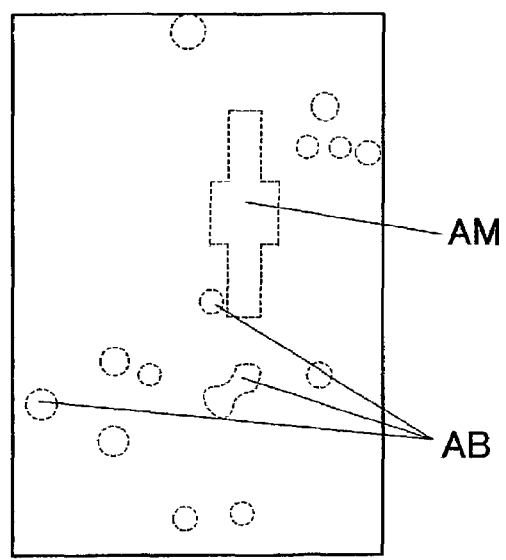
Figure 13A:
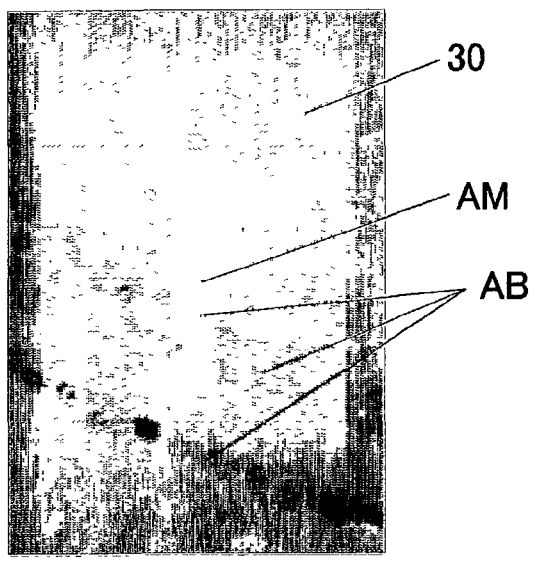
FIGS. 13A and 13B are another surface image including the alignment mark of the inspection object, and an explanatory view of the surface image, respectively.
Figure 13B:
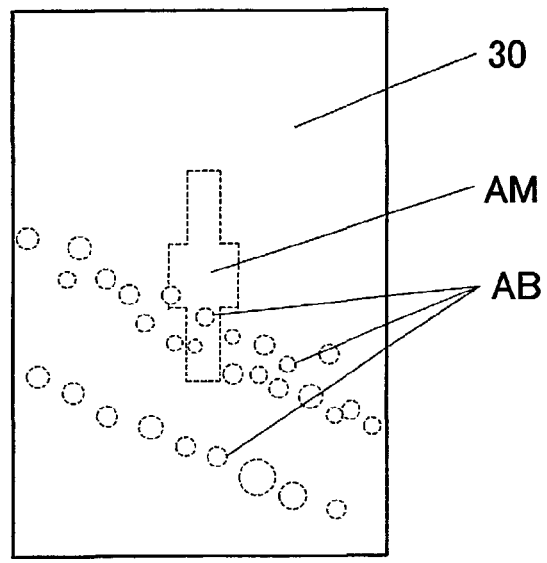

As claimed, it is essential in the pattern recognition apparatus of the present invention to comprise the image pickup unit 2, the first image processor 1A, reference image memory 4 and the detector 5. Therefore, the pattern recognition apparatus can further comprise a voluntary combination of the second image processor 1B (image searching unit), image-data reduction unit, image splitter 6 and the additional image splitter, if necessary. For example, FIG. 11 shows a pattern recognition apparatus with both of the second image processor 1B and the image-data reduction unit 6.

As a preferred application of the image processor of the present invention, the pattern recognition apparatus has been explained above. However, the application of the image processor is not limited to those embodiments. The image processor of the present invention is available in various application fields that need to recognize or detect a pattern such as letters, marks, lines, and graphic symbols from a surface image of an object without the influence of background noise. Concretely, when there is an image including letters and background noise, or when there is an image having letters overlapped a thin line, it is possible to eliminate the background noise or the thin line, and accurately extract only the letters by the image processor of the present invention.

INDUSTRIAL APPLICABILITY

The image processor of the present invention can generate, from a surface image of an object having a pattern, a processed image having a distinct contrast between the pattern and a background. In particular, there is an advantage that only the pattern can be clearly separated from the background, even when the background around the pattern includes a pixel having substantially the same concentration as the pattern.

As a preferred embodiment, when a pattern recognition apparatus with the above image processor is used in a manufacturing process of liquid-crystal display devices, it is possible to accurately recognize an alignment mark on an optically transparent or translucent substrate. Thus, the use of the image processor of the present invention in the pattern recognition apparatus is particularly effective to improve the inspection accuracy when a difference in concentration (brightness) between a pattern to be inspected and the background is small.

The invention claimed is:

1. An image processor for providing, from a surface image of an object having a pattern, a processed image having a distinct contrast between said pattern and a background, said image processor comprising:
    a first smoothing filter for generating a first smoothed image by determining, with respect to each of pixels of the surface image, a mean concentration value for said pixel and neighbor pixels in a first region defined around said pixel;
    a second smoothing filter for generating a second smoothed image by determining, with respect to each of pixels of the surface image, a mean concentration value for said pixel and neighbor pixels in a second region that is defined around said pixel so as to be greater than said first region;
    a weighting means for multiplying each of pixel values of said first smoothed image by a weight coefficient of 1 or more to determine a weighted pixel value;
    a differential image generator for subtracting each of weighted pixel values provided by said weighting means from a pixel value of a corresponding pixel of unweighted said second smoothed image to generate a differential image; and
    an image extracting means for extracting only pixel values having the positive sign from said differential image to obtain said processed image.

2. The image processor as set forth in claim 1, comprising a reverse image generator for generating a reverse image when said pattern has a higher brightness than the background in the surface image of said object,
    said reverse image generator determining a concentration value of each of pixels of said reverse image by subtracting a concentration value of each of pixels of the surface image of said object from a maximum concentration value of the surface image, and
    wherein said first and second smoothing filters respectively generate said first and second smoothed images from said reverse image.

3. A pattern recognition apparatus using the image processor as set forth in claim 1 as a first image processor, said apparatus comprising:
    an image pickup means for providing a surface image of an object;

said first image processor for generating, from a first surface image of a reference object having a pattern, a first reference image having a distinct contrast between said pattern and a background;

a memory for storing the first reference image; and a detector for comparing a surface image of an inspection object having the same pattern as said reference object with the first reference image to recognize said pattern on said inspection object.

4. The pattern recognition apparatus as set forth in claim 3, wherein said first image processor comprises a reverse image generator for generating a reverse image when said pattern has a higher brightness than the background in the first surface image of said reference object, said reverse image generator determining a concentration value of each of pixels of said reverse image by subtracting a concentration value of each of pixels of the first surface image of said reference object from a maximum concentration value of the first surface image, and wherein said first image processor generates the first reference image from said reverse image.

5. The pattern recognition apparatus as set forth in claim 3, comprising:

a means for providing a second surface image including said pattern of said reference object, the second surface image having a wider view field than the first reference image;

a second image processor for generating, from the second surface image of said reference object, a second reference image having a distinct contrast between said pattern and a background, said second image processor composed of the image processor as set forth in claim 1; and wherein said detector compares a surface image of said inspection object given by said image pickup means with the second reference image to search an image region including said pattern in the surface image of said inspection object, and recognizes said pattern from the image region by use of the first reference image.

6. The pattern recognition apparatus as set forth in claim 5, wherein said second image processor comprises a reverse image generator for generating a reverse image when said pattern has a higher brightness than the background in the second surface image of said reference object, said reverse image generator determining a concentration value of each of pixels of said reverse image by subtracting a concentration value of each of pixels of the second surface image from a maximum concentration value of the second surface image, and wherein said second image processor generates the second reference image from said reverse image.

7. The pattern recognition apparatus as set forth in claim 5, comprising an image splitter for providing split images each including at least a part of said pattern from the second reference image, and wherein said detector compares the surface image of said inspection object with the second reference image and each of said split images to search the image region including said pattern according to a comparison result with a highest degree of agreement therebetween.

8. The pattern recognition apparatus as set forth in claim 5, comprising:

an image data reduction means for performing an image data reduction treatment to the second reference image and the surface image of said inspection object to obtain a third reference image and a third surface image of said inspection object, respectively; and wherein said detector compares the third surface image of said inspection object with the third reference image to search the image region including said pattern.

9. The pattern recognition apparatus as set forth in claim 3, comprising an image splitter for providing split images each including at least a part of said pattern from the first reference image, and wherein said detector compares the surface image of said inspection object with the first reference image and each of said split images, and recognizes said pattern on said inspection object according to a comparison result with a highest degree of agreement therebetween.

10. An image processing method of providing, from a surface image of an object having a pattern, a processed image having a distinct contrast between said pattern and a background, said method comprising the steps of:

generating a first smoothed image by determining, with respect to each of pixels of the surface image, a mean concentration value for said pixel and neighbor pixels in a first region defined around said pixel;

generating a second smoothed image by determining, with respect to each of pixels of the surface image, a mean concentration value for said pixel and neighbor pixels in a second region that is defined around said pixel so as to be greater than said first region;

multiplying each of pixel values of said first smoothed image by a weight coefficient of 1 or more to determine a weighted pixel value;

subtracting each of weighted pixel values determined in said multiplying step from a pixel value of a corresponding pixel of unweighted said second smoothed image to determine a differential image; and extracting only pixel values having the positive sign from said differential image to obtain said processed image.

11. The image processing method as set forth in claim 10, comprising the step of generating a reverse image when said pattern has a higher brightness than the background in the surface image of said object, wherein a concentration value of each of pixels of said reverse image is determined by subtracting a concentration value of each of pixels of the surface image of said object from a maximum concentration value of the surface image, and wherein said first and second smoothed images are generated from said reverse image.

* * * * *